US 12,205,032 B2

(12) United States Patent
Ostrovski et al.

(10) Patent No.: US 12,205,032 B2
(45) Date of Patent: *Jan. 21, 2025

(54) DISTRIBUTIONAL REINFORCEMENT LEARNING USING QUANTILE FUNCTION NEURAL NETWORKS

(71) Applicant: DeepMind Technologies Limited, London (GB)

(72) Inventors: Georg Ostrovski, London (GB); William Clinton Dabney, London (GB)

(73) Assignee: DeepMind Technologies Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/542,476

(22) Filed: Dec. 15, 2023

(65) Prior Publication Data

US 2024/0135182 A1    Apr. 25, 2024

Related U.S. Application Data

(63) Continuation of application No. 18/169,803, filed on Feb. 15, 2023, now Pat. No. 11,887,000, which is a
(Continued)

(51) Int. Cl.
*G06N 3/08*    (2023.01)
*G06N 3/04*    (2023.01)

(52) U.S. Cl.
CPC ............ *G06N 3/08* (2013.01); *G06N 3/04* (2013.01)

(58) Field of Classification Search
CPC .. G06N 3/08; G06N 3/04; G06N 7/01; G06N 3/047; G06N 3/092; G06N 3/084
See application file for complete search history.

(56) References Cited

U.S. PATENT DOCUMENTS

2017/0076201 A1*   3/2017   van Hasselt ............ G06N 3/08
2019/0332923 A1*  10/2019   Gendron-Bellemare ...................
                                                G06N 7/01

FOREIGN PATENT DOCUMENTS

CN        106094516        11/2016
WO    WO 2017091629    *  6/2017    ............... G06N 3/08

OTHER PUBLICATIONS

[No Author Listed], "Autoregressive Quantile Networks for Generative Modeling," International Conference on Machine Learning, 2018, 16 pages.

(Continued)

*Primary Examiner* — Yosef K Laekemariam
(74) *Attorney, Agent, or Firm* — Fish & Richardson P.C.

(57) ABSTRACT

Methods, systems, and apparatus, including computer programs encoded on a computer storage medium, for selecting an action to be performed by a reinforcement learning agent interacting with an environment. In one aspect, a method comprises: receiving a current observation; for each action of a plurality of actions: randomly sampling one or more probability values; for each probability value: processing the action, the current observation, and the probability value using a quantile function network to generate an estimated quantile value for the probability value with respect to a probability distribution over possible returns that would result from the agent performing the action in response to the current observation; determining a measure of central tendency of the one or more estimated quantile values; and selecting an action to be performed by the agent in response to the current observation using the measures of central tendency for the actions.

20 Claims, 4 Drawing Sheets

Related U.S. Application Data continuation of application No. 16/767,046, filed as application No. PCT/EP2019/053315 on Feb. 11, 2019, now Pat. No. 11,610,118.

(60) Provisional application No. 62/646,154, filed on Mar. 21, 2018, provisional application No. 62/628,875, filed on Feb. 9, 2018.

(56) References Cited

OTHER PUBLICATIONS

Allais, "Allais paradox," Utility and Probability, 1990, pp. 3-9.
Arjovsky et al., "Wasserstein GAN," CoRR, Dec. 2017, arXiv;1701.07875v3, 32 pages.
Azar et al., "On the sample complexity of reinforcement learning with a generative model," CoRR, Jun. 2012, https://arxiv.org/ftp/arxiv/papers/1206/1206.6461, 8 pages.
Barth-Maron et al., "Distributed Distributional Deterministic Policy Gradients," CoRR, Apr. 2018, https://arxiv.org/abs/1804.08617, 16 pages.
Bellemare et al., "A distributional perspective on reinforcement learning," CoRR, Jul. 2017, https://arxiv.org/abs/1707.06887, 19 pages.
Bellemare et al., "The Arcade Learning Environment; an evaluation platform for general agents," Journal of Artificial Intelligence Research, Jun. 2013, 47:253-279.
Bellman, "Dynamic Programming," Science, Jul. 1966, 153(3731):34-37.
Bousquet et al., "From optimal transport to generative modeling: the vegan cookbook," CoRR, May 2017, https://arxiv.org/abs/1705.07642, 15 pages.
Chow et al., "Algorithms for CVaR optimization in MDPs," Advances in Neural Information Processing Systems 27 (NIPS 2014), 2014, 9 pages.
Dabney et al., "Distributional reinforcement learning with quantile regression," CoRR, Oct. 2017, https://arxiv.org/abs/1710.10044, 14 pages.
Dabney et al., "Implicit Quantile Networks for Distributional Reinforcement Learning," CoRR, Jun. 2018, arXiv:1806.06923v1, 14 pages.
Dhaene et al., "Remarks on quantiles and distortion risk measures.," European Actuarial Journal, Nov. 2012, 2(2):319-328.
Fortunato et al., "Noisy networks for exploration," CoRR, Jun. 2017, https://arxiv.org/abs/1706.10295, 21 pages.
Geist et al., "Kalman temporal differences," Journal of Artificial Intelligence Research, Oct. 2010, 39:483-532.
Gonzalez et al., "On the shape of the probability weighting function," Cognitive Psychology, Feb. 1999, 38(1):129-166.
Gruslys et al., "The Reactor: a fast and sample efficient actor-critic agent for reinforcement learning," CoRR, Apr. 2017, https://arxiv.org/abs/1704.04651, 18 pages.
Hasselt et al., "Deep reinforcement learning with double Q-learning," CoRR, Sep. 2015, https://arxiv.org/abs/1509.06461, 13 pages.
Hessel et al., "Rainbow: combining improvements in deep reinforcement learning," CoRR, Oct. 2017, https://arxiv.org/abs/1710.02298, 14 pages.
Howard et al., "Risk-sensitive markov decision processes," Management Science, Mar. 1972, 18(7):356-369.
Huber et al., "Robust estimation of a location parameter," Breakthrough in Statistics, Jun. 1963, pp. 492-518.
Jaquette, "Markov decision processes with a new optimality criterion: discrete time," The Annals of Statistics, May 1973, 1(3):496-505.
Lattimore et al., "PAC bounds for discounted MDPs," International Conference on Algorithmic Learning Theory, 2012, pp. 320-334.
Maddison et al., "Particle value functions," CoRR, Mar. 2017, https://arxiv.org/abs/1703.05820, 12 pages.
Majumdar et al., "How should a robot assess risk? Towards an axiomatic theory of risk in robotics," CoRR, Oct. 2017, https://arxiv.org/abs/1710.11040, 16 pages.

Marcus et al., "Risk sensitive markov decision processes," Systems and Control in the Twenty-First Century, 1997, pp. 263-279.
Mnih et al., "Human-level control through deep reinforcement learning," Nature, Feb. 2015, 518(7540):529-533.
Moerland et al., "Efficient exploration with double uncertain value networks," CoRR, Nov. 2017, https://arxiv.org/abs/1711.10789, 17 pages.
Morimura et al., "Nonparametric return distribution approximation for reinforcement learning," Proceedings of the 27th International Conference on Machine Learning (ICML), 2010, 8 pages.
Morimura et al., "Parametric return density estimation for reinforcement learning," CoRR, Mar. 2012, https://arxiv.org/ftp/arxiv/papers/1203/1203.3497, 8 pages.
Muller, "Integral probability metrics and their generating classes of functions," Advances in Applied Probability, Jun. 1997, 29(2):429-443.
Nair et al., "Massively parallel methods for deep reinforcement learning," CoRR, Jul. 2015, https://arxiv.org/abs/1507.04296, 14 pages.
Office Action in European Appln. No. 19704796.2, dated Aug. 25, 2023, 16 pages.
Office Action in European Appln. No. 19704796.2, dated Jan. 27, 2023, 13 pages.
Osband et al., "(More) efficient reinforcement learning via posterior sampling," Advances in Neural Information Processing Systems 26 (NIPS 2013), 2013, 10 pages.
PCT International Preliminary Report on Patentability in International Appln. No. PCT/EP2019053315, dated Aug. 11, 2020, 14 pages.
PCT International Search Report and Written Opinion in International Appln. No. PCT/EP2019053315, dated May 8, 2019, 22 pages.
Rowland et al., "An analysis of categorical distributional reinforcement learning," CoRR, Feb. 2018, https://arxiv.org/abs/1802.08163, 19 pages.
Schaul et al., "Prioritized experience replay," CoRR, Nov. 2015, https://arxiv.org/abs/1511.05952, 21 pages.
Schaul et al., "Universal value function approximators," In International Conference on Machine Learning, 2015, 37:1312-1320.
Sobel, "The variance of discounted markov decision processes," Journal of Applied Probability, Dec. 1982, 19(4):794-802.
Sutton, "Learning to predict by the methods of temporal differences," Machine Learning, 1988, 3(1):9-44.
Tolstikhin et al., "Wasserstein auto-encoders," CoRR, Nov. 2017, https://arxiv.org/abs/1711.01558, 20 pages.
Tversky et al., "Advances in prospect theory: cumulative representation of uncertainty," Journal of Risk and Uncertainty, Oct. 1992, 5(4):297-323.
Wang et al., "A class of distortion operators for pricing financial and insurance risks," Journal of Risk and Insurance, Mar. 2000, 67(1):15-36.
Wang et al., "Dueling network architectures for deep reinforcement learning," Proceedings of The 33rd. International Conference on Machine Learning, PMLR, 2016, 48: 9 pages.
Wang et al., "Premium calculation by transforming the layer premium density," ASTIN Bulletin: The Journal of the IAA, May 1996, 26(1):71-92.
Watkins, "Learning from delayed rewards," Thesis for the degree of Doctor, King's College, May 1989, 241 pages.
White, "Mean, variance, and probabilistic criteria in finite markov decision processes: a review," Journal of Optimization Theory and Applications, 1988, 56(1):1-29.
Wu et al., "Curvature of the probability weighting function," Management Science, Dec. 1996, 42(12):1676-1690.
Yaari, "The dual theory of choice under risk," Econometrica: Journal of the Econometric Society, Jan. 1987, 55(1):95-115.
Yu et al., "More than a million ways to be pushed. a high-fidelity experimental dataset of planar pushing," 2016 IEEE/RSJ International Conference on Intelligent Robots and Systems (IROS), Oct. 9-14, 2016, 8 pages.

* cited by examiner

DISTRIBUTIONAL REINFORCEMENT LEARNING USING QUANTILE FUNCTION NEURAL NETWORKS

CROSS REFERENCE TO RELATED APPLICATION

This application is a continuation application of U.S. application Ser. No. 18/169,803, filed Feb. 15, 2023, which is a continuation application of U.S. application Ser. No. 16/767,046, filed May 26, 2020, which is a National Stage Application under 35 U.S.C. § 371 and claims the benefit of International Application No. PCT/EP2019/053315, filed Feb. 11, 2019, which claims priority to U.S. Provisional Application No. 62/646,154, filed Mar. 21, 2018, and U.S. Provisional Application No. 62/628,875, filed Feb. 9, 2018, the disclosure of which is incorporated herein by reference.

BACKGROUND

This specification relates to reinforcement learning.

An agent can interact with an environment by performing actions that are selected in response to receiving observations that characterize the current state of the environment. The action to be performed by the agent in response to receiving a given observation can be determined in accordance with the output of a neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that selects actions to be performed by an agent interacting with an environment using a quantile function neural network.

According to a first aspect there is provided a method of selecting an action to be performed by a reinforcement learning agent interacting with an environment, the method comprising: receiving a current observation characterizing a current state of the environment; for each action of a plurality of actions that can be performed by the agent to interact with the environment: randomly sampling one or more probability values; for each probability value: processing the action, the current observation, and the probability value using a quantile function network having a plurality of network parameters, wherein the quantile function network is a neural network that is configured to process the action, the current observation, and the probability value in accordance with current values of the network parameters to generate a network output that indicates an estimated quantile value for the probability value with respect to a probability distribution over possible returns that would result from the agent performing the action in response to the current observation, wherein a quantile value for a probability value with respect to a probability distribution refers to a threshold value below which random draws from the probability distribution would fall with probability given by the probability value; determining a measure of central tendency of the one or more estimated quantile values generated by the quantile function network; and selecting an action from the plurality of possible actions to be performed by the agent in response to the current observation using the measures of central tendency for the actions. A method of this aspect may be implemented by one or more computers.

In a method of this aspect a "probability value" is a numerical value between 0 and 1. The "network parameters" are parameters that define the quantile function network (e.g., the weights of the quantile function network), and hence implicitly define the quantile function—the quantile function network implicitly represents the quantile function through the quantile function network parameter values.

In an implementation selecting an action to be performed by the agent comprises: selecting an action having the highest measure of central tendency. In an implementation selecting an action to be performed by the agent comprises: selecting an action having the highest measure of central tendency with probability 1-$\varepsilon$ and selecting an action randomly from the plurality of actions with probability $\varepsilon$. In an implementation each of the probability values are sampled from a uniform distribution over the interval [0,1]. In an implementation each of the probability values is transformed by a distortion risk measure function prior to being processed by the quantile function network. In an implementation the distortion risk measure function is a non-decreasing function mapping a domain [0,1] to a range [0,1]; the distortion risk measure function maps the point 0 in the domain to the point 0 in the range; and the distortion risk measure function maps the point 1 in the domain to the point 1 in the range. In an implementation the measure of central tendency is a mean of the estimated quantile values for the action. In an implementation, processing the action, the current observation, and the probability value using the quantile function network comprises: processing the current observation using one or more convolutional neural network layers to generate an encoded representation of the current observation; processing the probability value using one or more neural network layers to generate an encoded representation of the probability value that has a same dimensionality as the encoded representation of the current observation; determining a combined representation by pointwise multiplying the encoded representation of the current observation and the encoded representation of the probability value; and processing the combined representation and a numerical representation of the action using one or more fully-connected neural network layers.

In a further implementation, any method of the first aspect further comprises causing the agent to perform the selected action.

According to another aspect there is provided a method of controlling an autonomous or semi-autonomous vehicle (which may be a land, sea or air vehicle) that comprises selecting an action according to a method of the first aspect. According to another aspect there is provided a method of controlling a robotic agent, a mechanical agent or an electronic agent to perform a task (such as locating an object of interest, moving an object of interest to a specified location, or navigating to a specified destination) that comprises selecting an action according to a method of the first aspect.

According to another aspect there is provided a method of training a quantile function network, the method comprising: obtaining an experience tuple that includes (i) a current training observation, (ii) a current action performed by the agent in response to the current training observation, (iii) a current reward received in response to the agent performing the current action, and (iv) a next training observation characterizing a state that the environment transitioned into as a result of the agent performing the current action; for each action in the plurality of actions: randomly sampling one or more probability values; for each probability value: processing the action, the next training observation, and the probability value using the quantile function network, in accordance with current values of network parameters, to generate a network output that indicates an estimated quantile value for the probability value with respect to a probability distribution over possible returns that would result from the agent performing the action in response to the next training observation; determining a measure of central tendency of the one or more estimated quantile values generated by the quantile function network; determining an argmax action, wherein the argmax action is an action from the plurality of actions for which the measure of central tendency of the estimated quantile values is highest; determining one or more temporal differences, wherein determining a temporal difference comprises: determining a first estimated quantile value, comprising: randomly sampling a first probability value; processing the current training observation, the current action, and the first probability value using the quantile function network and in accordance with current values of the network parameters to generate a network output that indicates the first estimated quantile value; determining a second estimated quantile value, comprising: randomly sampling a second probability value; processing the next training observation, the argmax action, and the second probability value using the quantile function network and in accordance with current values of the network parameters to generate a network output that indicates a second estimated quantile value; determining the temporal difference based on at least: (i) the current reward, (ii) the first estimated quantile value, and (iii) the second estimated quantile value; determining a gradient with respect to the network parameters of a loss function that depends on the temporal differences; and updating the current values of the network parameters using the gradient. A method of this aspect may be used in training a quantile function network that is for use in a method of the first aspect.

In an implementation a temporal difference is equal to the current reward, plus a product of a discount factor and the second estimated quantile value, and minus the first estimated quantile value. In an implementation the loss function comprises a quantile regression loss term for each temporal difference, wherein a probability value parameter for the quantile regression loss term for a temporal difference is given by the first probability value corresponding to the first estimated quantile value for the temporal difference. In an implementation a quantile regression loss term for a temporal difference comprises a product of: (i) a function of the temporal difference, and (ii) a function of a difference between the probability value parameter for the quantile regression loss term and an indicator function that has value 1 if and only if the temporal difference is negative, and has value 0 otherwise. In an implementation sampling a probability value further comprises transforming the probability value with the distortion function.

According to another aspect there is provided a system comprising one or more computers and one or more storage devices storing instructions that when executed by the one or more computers cause the one or more computers to perform the respective operations of a method according to any aspect or implementation described herein. A system of this aspect may be comprised in a control system for an autonomous or semi-autonomous vehicle (which may be a land, sea or air vehicle), in a control system for a robotic agent, in a control system for a mechanical agent, or in a control system for an electronic agent.

According to another aspect there is provided one or more computer storage media storing instructions that when executed by one or more computers cause the one or more computers to perform the respective operations of a method according to any aspect or implementation described herein.

Particular embodiments of the subject matter described in this specification can be implemented so as to realize one or more of the following advantages.

The reinforcement learning system described in this specification includes a quantile function neural network that implicitly models the quantile function of the probability distribution over possible returns that would be received if an agent performs a particular action in response to an observation. The distributional reinforcement learning system described in this specification has several advantages over some of conventional systems. A few examples follow.

First, the quantile function neural network is capable of approximating any probability distribution over possible returns given sufficient network capacity (i.e., complexity). In contrast, some conventional reinforcement learning systems model the probability distribution over possible returns using restrictive classes of distributions, for example, (i) categorical distributions, or (ii) distributions that can be modelled by a mixture of Dirac delta functions. By modeling probability distributions over possible returns more accurately than some conventional systems, the system described in this specification can enable the agent to select actions which cause desired tasks to be accomplished more effectively (e.g., more quickly).

Second, the system described in this specification can update the quantile function neural network using as many quantile function samples per training iteration (e.g., in determining the "temporal differences" described in more detail later) as desired, unlike some conventional systems. The system may therefore be able to train the agent more quickly (e.g., over fewer training iterations) than it otherwise would be, thereby enabling the system to consume fewer computational resources (e.g. memory and computing power) during training of the agent.

Third, by exploiting the implicit representation of the quantile function of the return distribution, the system can select the actions to be performed by the agent using a larger class of action selection policies than in some conventional systems. For example, as will be described in more detail below, the system can implement a "risk-sensitive" action selection policy by selecting actions that are based on more than just the measures of central tendency of the return distributions corresponding to each possible action. By choosing an appropriate distortion risk measure function, the system can implement an action selection policy that is more risk-averse or more risk-seeking. Therefore, the system described in this specification may be better suited for real-world applications than some conventional systems. For example, the system described in this specification can be used to implement a risk-averse action selection policy for real-world applications (e.g., control of autonomous vehicles) where the consequences of performing poorly selected actions may be dangerous.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
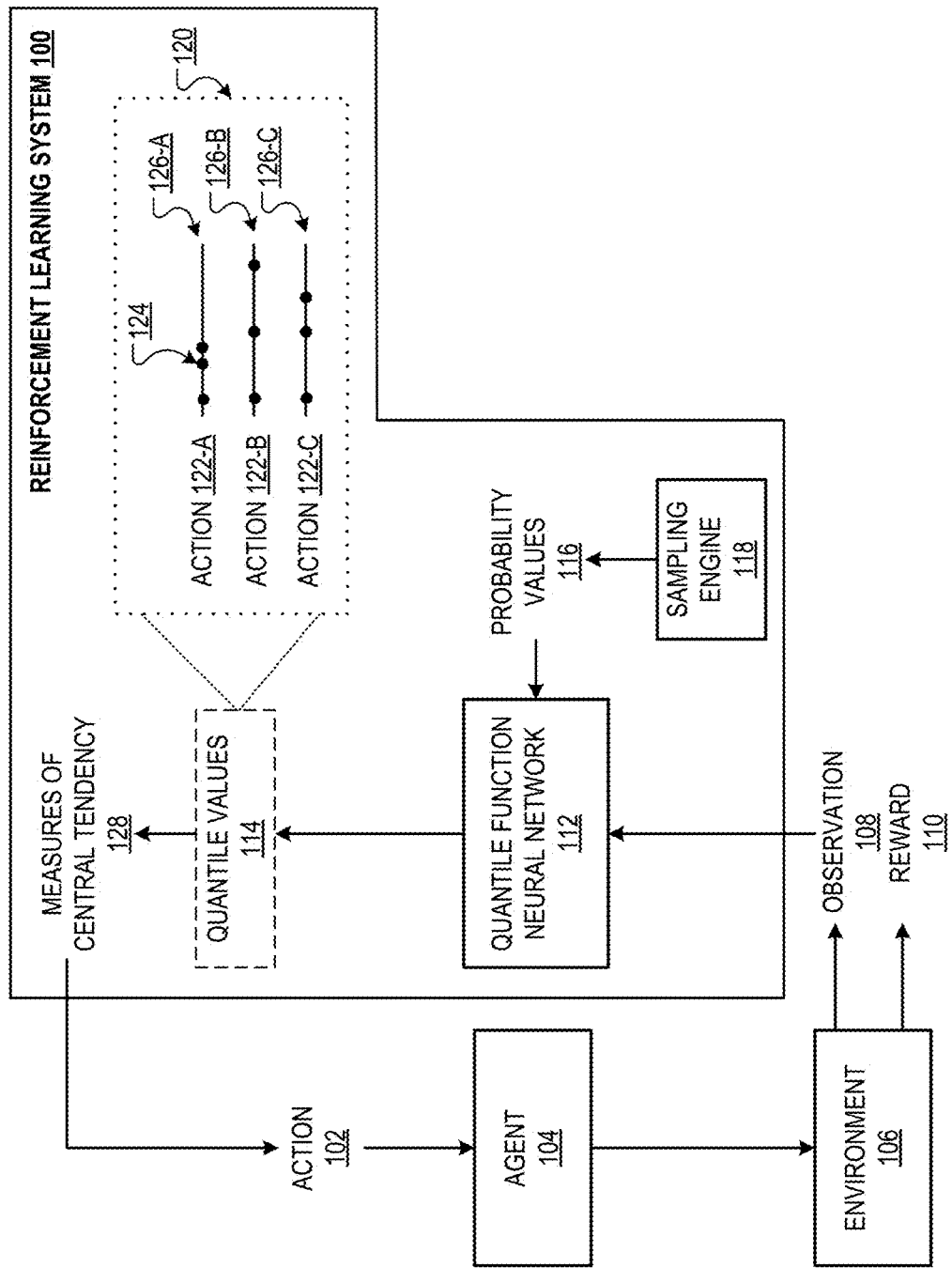
FIG. 1 is a block diagram of an example reinforcement learning system.

FIG. 1 is a block diagram of an example reinforcement learning system 100. The reinforcement learning system 100 is an example of a system implemented as computer programs on one or more computers in one or more locations in which the systems, components, and techniques described below are implemented.

The system 100 selects actions 102 to be performed by an agent 104 interacting with an environment 106 at each of multiple time steps. At each time step, the system 100 receives data characterizing the current state of the environment 106, e.g., an image of the environment 106, and selects an action 102 to be performed by the agent 104 in response to the received data. Data characterizing a state of the environment 106 will be referred to in this specification as an observation 108.

At each time step, the state of the environment 106 at the time step (as characterized by the observation 108) depends on the state of the environment 106 at the previous time step and the action 102 performed by the agent 104 at the previous time step.

At each time step, the system 100 may receive a reward 110 based on the current state of the environment 106 and the action 102 of the agent 104 at the time step. In general, the reward 110 is a numerical value. The reward 110 can be based on any event or aspect of the environment 106. For example, the reward 110 may indicate whether the agent 104 has accomplished a task (e.g., navigating to a target location in the environment 106) or the progress of the agent 104 towards accomplishing a task.

In some implementations, the environment is a real-world environment and the agent is a mechanical agent interacting with the real-world environment. For example, the agent may be a robot interacting with the environment to accomplish a specific task, e.g., to locate an object of interest in the environment or to move an object of interest to a specified location in the environment or to navigate to a specified destination in the environment; or the agent may be an autonomous or semi-autonomous land or air or sea vehicle navigating through the environment.

In these implementations, the observations may include, for example, one or more of images, object position data, and sensor data to capture observations as the agent as it interacts with the environment, for example sensor data from an image, distance, or position sensor or from an actuator.

For example in the case of a robot the observations may include data characterizing the current state of the robot, e.g., one or more of: joint position, joint velocity, joint force, torque or acceleration, for example gravity-compensated torque feedback, and global or relative pose of an item held by the robot.

In the case of a robot or other mechanical agent or vehicle the observations may similarly include one or more of the position, linear or angular velocity, force, torque or acceleration, and global or relative pose of one or more parts of the agent. The observations may be defined in 1, 2 or 3 dimensions, and may be absolute and/or relative observations.

The observations may also include, for example, sensed electronic signals such as motor current or a temperature signal; and/or image or video data for example from a camera or a LIDAR sensor, e.g., data from sensors of the agent or data from sensors that are located separately from the agent in the environment.

In the case of an electronic agent the observations may include data from one or more sensors monitoring part of a plant or service facility such as current, voltage, power, temperature and other sensors and/or electronic signals representing the functioning of electronic and/or mechanical items of equipment.

In these implementations, the actions may be control inputs to control the robot, e.g., torques for the joints of the robot or higher-level control commands, or the autonomous or semi-autonomous land or air or sea vehicle, e.g., torques to the control surface or other control elements of the vehicle or higher-level control commands.

In other words, the actions can include for example, position, velocity, or force/torque/acceleration data for one or more joints of a robot or parts of another mechanical agent. Action data may additionally or alternatively include electronic control data such as motor control data, or more generally data for controlling one or more electronic devices within the environment the control of which has an effect on the observed state of the environment. For example in the case of an autonomous or semi-autonomous land or air or sea vehicle the actions may include actions to control navigation e.g. steering, and movement e.g braking and/or acceleration of the vehicle.

In some implementations the environment is a simulated environment and the agent is implemented as one or more computers interacting with the simulated environment.

For example the simulated environment may be a simulation of a robot or vehicle and the reinforcement learning system may be trained on the simulation. For example, the simulated environment may be a motion simulation environment, e.g., a driving simulation or a flight simulation, and the agent is a simulated vehicle navigating through the motion simulation. In these implementations, the actions may be control inputs to control the simulated user or simulated vehicle.

In another example, the simulated environment may be a video game and the agent may be a simulated user playing the video game.

In a further example the environment may be a protein folding environment such that each state is a respective state of a protein chain and the agent is a computer system for determining how to fold the protein chain. In this example, the actions are possible folding actions for folding the protein chain and the result to be achieved may include, e.g., folding the protein so that the protein is stable and so that it achieves a particular biological function. As another example, the agent may be a mechanical agent that performs or controls the protein folding actions selected by the system automatically without human interaction. The observations may include direct or indirect observations of a state of the protein and/or may be derived from simulation.

In a similar way the environment may be a drug design environment such that each state is a respective state of a potential pharma chemical drug and the agent is a computer system for determining elements of the pharma chemical drug and/or a synthetic pathway for the pharma chemical drug. The drug/synthesis may be designed based on a reward derived from a target for the drug, for example in simulation. As another example, the agent may be a mechanical agent that performs or controls synthesis of the drug.

Generally in the case of a simulated environment the observations may include simulated versions of one or more of the previously described observations or types of observations and the actions may include simulated versions of one or more of the previously described actions or types of actions.

In some other applications the agent may control actions in a real-world environment including items of equipment, for example in a data center or grid mains power or water distribution system, or in a manufacturing plant or service facility. The observations may then relate to operation of the plant or facility. For example the observations may include observations of power or water usage by equipment, or observations of power generation or distribution control, or observations of usage of a resource or of waste production. The agent may control actions in the environment to increase efficiency, for example by reducing resource usage, and/or reduce the environmental impact of operations in the environment, for example by reducing waste. The actions may include actions controlling or imposing operating conditions on items of equipment of the plant/facility, and/or actions that result in changes to settings in the operation of the plant/facility e.g. to adjust or turn on/off components of the plant/facility.

In some further applications, the environment is a real-world environment and the agent manages distribution of tasks across computing resources e.g. on a mobile device and/or in a data center. In these implementations, the actions may include assigning tasks to particular computing resources.

As further example, the actions may include presenting advertisements, the observations may include advertisement impressions or a click-through count or rate, and the reward may characterize previous selections of items or content taken by one or more users.

Optionally, in any of the above implementations, the observation at any given time step may include data from a previous time step that may be beneficial in characterizing the environment, e.g., the action performed at the previous time step, the reward received at the previous time step, and so on.

The system 100 includes a quantile function neural network 112 that is configured to process an input including: (i) an action from a set of actions that can be performed by the agent, (ii) an observation, and (iii) a probability value. The input to the quantile function network 112 is referred to in this specification as an action—observation—probability value tuple. The quantile function neural network 112 is configured to process the input to generate an estimated quantile value 114 for the probability value 116 with respect to a probability distribution over possible "returns" that would result from the agent performing the action in response to the observation. A return refers to a cumulative measure of reward received by the system 100 as the agent 104 interacts with the environment 106 over multiple time steps. For example, a return may refer to a long-term time-discounted cumulative reward received by the system 100. A probability distribution over possible returns is referred to in this specification as a "return distribution".

The quantile value for a probability value with respect to a return distribution refers to a threshold return value below which random draws from the return distribution would fall with probability given by the probability value. Put another way, the quantile value for a probability value with respect to a return distribution can be obtained by evaluating the inverse of the cumulative distribution function (CDF) for the return distribution at the probability value. That is, integrating a probability density function for a return distribution up to the quantile value for a probability value would yield the probability value itself.

In some cases, rather than processing an action—observation—probability value tuple, the quantile function network 112 may be configured to process an observation—probability value tuple (i.e., without the action). In these cases, the quantile function network 112 may generate respective estimated quantile values for the probability value with respect to the respective return distributions that would result from the agent performing each action in a set of possible actions in response to the observation.

The quantile function network 112 may be implemented as any appropriate deep neural network model. An example architecture of the quantile function network 112 is described in more detail with reference to step 508 of FIG. 5.

The system 100 uses the quantile function network 112 in selecting actions 102 to be performed by the agent 104 in response to observations 108 at each time step. In particular, at each time step, for each given action from the set of actions that can be performed by the agent 104, the system 100 uses a sampling engine 118 to randomly sample one or more probability values 116 (each of which is a number in the range [0,1]). For each probability value, the system 100 processes a given action—current observation—probability value tuple using the quantile function network 112 to generate an estimated quantile value for the probability value with respect to the return distribution that would result from the agent performing the given action in response to the current observation. In this manner, the system 100 generates a respective set of one or more quantile values 114 for each action from the set of actions that can be performed by the agent 104, as illustrated by 120. In the illustration 120, the system 100 generates a respective set of three quantile values for each of the actions 122-A, 122-B, 122-C. For each of the actions, the corresponding quantiles values are illustrated as respective circles (e.g., the circle 124) on a number line (e.g., the number lines 126-A, 126-B, and 126-C).

For each action, the system 100 determines a corresponding measure of central tendency 128 (where a "measure of central tendency" is a single value that attempts to describe a set of data by identifying a central position within that set of data, i.e., a central or typical value) of the respective set of one or more quantile values 114 for the action. For example, the measure of central tendency may be a mean, a median, or a mode.

The system 100 selects an action 102 to be performed by the agent 104 at the time step based on the measures of central tendency 128 corresponding to the actions. In some implementations, the system 100 selects an action having a highest corresponding measure of central tendency 128 from amongst all the actions in the set of actions that can be performed by the agent 104. In some implementations, the system 100 selects an action in accordance with an exploration strategy. For example, the system 100 may use an E-greedy exploration strategy. In this example, the system 100 may select an action having a highest corresponding measure of central tendency with probability 1-$\epsilon$, and select an action randomly with probability $\epsilon$, where $\epsilon$ is a number between 0 and 1.

In contrast to the system of the present disclosure, some conventional systems select actions to be performed by an agent by directly estimating a measure of central tendency of the return distribution that would result from the agent performing an action in response to an observation. By modeling the quantile function of the return distribution rather than just estimating the measure of central tendency of the return distribution, the system of the present disclosure can learn a richer (and thereby more effective) action selection policy. Some other conventional systems model the return distribution using a restrictive class of distribution models (e.g., categorical distributions). The system of the present disclosure can model any return distribution given sufficient network capacity of the quantile function network and can thereby learn a richer action selection policy.

The sampling engine 118 may be configured to generate probability values 116 in any appropriate manner. For example, the sampling engine 118 may generate probability values 116 by sampling them from a probability distribution. Since each of the probability values 116 generated by the sampling engine 118 are in the range [0,1] (i.e., are at least 0 and at most 1), the probability distribution must be supported in the range [0,1].

The sampling engine 118 may generate probability values 116 which are sampled from a uniform probability distribution over the interval [0,1]. In this case, the quantile values generated by the quantile function network 112 by processing action—observation—probability value tuples can be understood to represent return values that are randomly sampled from the return distribution that would result from the agent performing the action in response to the observation. Therefore, the system 100 selects the actions 102 to be performed by the agent based on respective measures of central tendency (e.g., means) of the return distribution corresponding to each possible action.

The system 100 can implement a "risk-sensitive" action selection policy by selecting actions that are based on more than just the measures of central tendency of the return distributions corresponding to each possible action. The system can implement a risk-sensitive action selection policy by using the sampling engine 118 to transform the probability values 116 using a distortion risk measure function prior to providing the probability values 116 to the quantile function network 112. In this case, the quantile values generated by the quantile function network 112 by processing action—observation—probability value tuples represents return values that are randomly sampled from a transformed return distribution (i.e., that is different from the original return distribution). As will be described in more detail with reference to FIG. 5, by choosing an appropriate distortion risk measure function, the system 100 can implement an action selection policy that is more risk-averse or more risk-seeking. An action selection policy may be understood to be more risk-seeking if it is more likely to select actions that may result in higher returns even if this also results in a higher likelihood of receiving lower returns. An action selection policy may be understood to be more risk-averse if it is less likely to select actions that may result in higher returns if this also results in a higher likelihood of receiving lower returns.

The system 100 is configured to train the quantile function network 112 over multiple training iterations using reinforcement learning techniques. The system 100 trains the quantile function network 112 by iteratively (i.e., at each training iteration) adjusting the current values of the quantile function network parameters. By training the quantile function network 112, the system 100 may cause the quantile function network 112 to generate outputs that result in the selection of actions 102 to be performed by the agent 104 which increase a cumulative measure of reward received by the system 100. By increasing a cumulative measure of reward received by the system 100 (e.g., a long-term time-discounted cumulative reward), the system 100 may (by extension) cause the agent 104 to perform given tasks more effectively.

The system 100 trains the quantile function network 112 based on training data including a set of multiple experience tuples. Each experience tuple includes data indicating: (i) a training observation, (ii) an action performed by the agent in response to the training observation, (iii) a reward received in response to the agent performing the action, and (iv) a next training observation characterizing a state that the environment transitioned into as a result of the agent performing the action. The set of experience tuples may include online experience tuples, offline experience tuples, or both. An online experience tuple refers to an experience tuple where the action included in the experience tuple was selected based on outputs generated by the quantile function network 112 in accordance with current values of quantile function network parameters. An offline experience tuple refers to an experience tuple where the action included in the experience tuple may have been selected in accordance with an action selection policy that is different than the action selection policy defined by the current values of the quantile function network parameters.

In some implementations, the system 100 uses a target quantile function network during training Generally, the target quantile function network has the same neural network architecture (e.g., number of layers, neuron topology, and the like) as the quantile function network 112. Moreover, the target quantile function network is also (similar to the quantile function network 112) configured to process action—observation—probability value tuples to generate outputs that indicate estimated quantiles with respect to return distributions. However, the values of the target quantile function network parameters may be different than values of the corresponding quantile function network parameters.

Generally, during the training, the system 100 constrains the values of the target quantile function network parameters to change more slowly than the values of the quantile function network parameters. In particular, the system 100 may periodically (e.g., after given numbers of training iterations) update the values of the target quantile function network parameters based on the current values of the quantile function network parameters. For example, the system 100 may update the values of the target quantile function network parameters to match the current values of the quantile function network parameters. As another example, the system 100 may update the values of the target quantile function network parameters by interpolating between the current values of the target quantile function network parameters and the current values of the quantile function network parameters. For example, the system 100 may set the value of each target quantile function network parameter to be an average of the current value of the target quantile function network parameter and the value of the corresponding quantile function network parameter.

Figure 2:
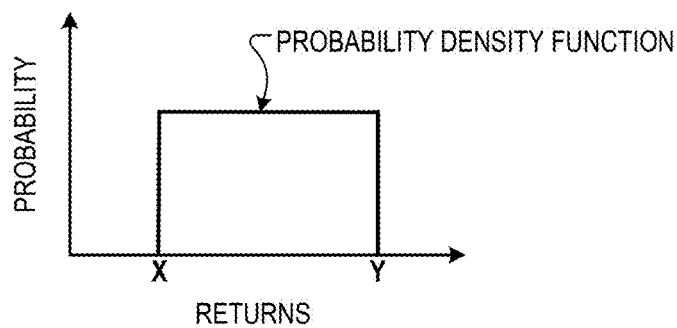
FIG. 2 illustrates a probability density function (PDF) of a return distribution over possible returns that would result from the agent performing an action in response to an observation.

FIG. 2 illustrates a probability density function (PDF) of a return distribution over possible returns that would result from the agent performing an action in response to an observation. The PDF associates a respective probability (represented by the vertical axis) with each of multiple possible return values (represented by the horizontal axis). The return distribution indicates that in response to performing the action, any return value in the interval [X,Y] (where X and Y are labelled on the horizontal axis) is equally likely, and any return value outside the interval [X,Y] has probability 0.

Figure 3:
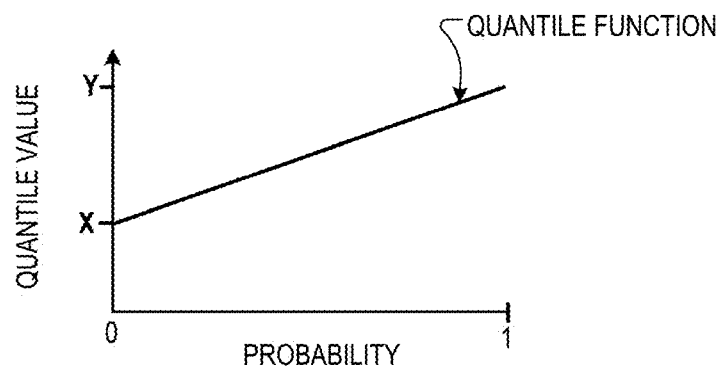
FIG. 3 illustrates a quantile function corresponding to a return distribution.
Figure 4:
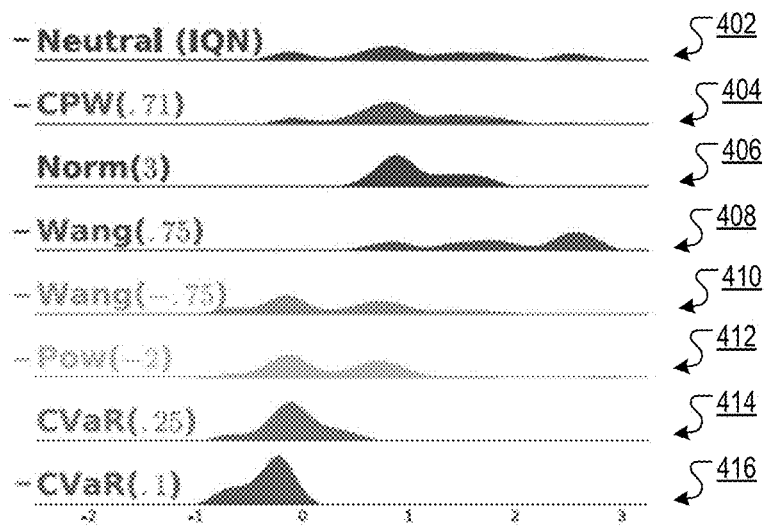
FIG. 4 illustrates a return distribution and multiple transformed return distributions corresponding to respective distortion risk measure functions.

FIG. 3 illustrates a quantile function corresponding to the return distribution illustrated by FIG. 2. The quantile function associates a respective quantile value (represented by the vertical axis) with each of multiple possible probability values (represented by the horizontal axis). The quantile function network (e.g., described with reference to FIG. 1) implicitly represents the quantile function through the quantile function network parameter values. The quantile function, associated with a probability distribution of a random variable, specifies the value of the random variable such that the probability of the variable being less than or equal to that value equals the given probability. Thus, the quantile function of FIG. 3 associates the quantile value X with the probability value 0, since a return value below X is not possible for the probability density function of FIG. 2 (a return value below X has a probability of zero). Similarly, the quantile function of FIG. 3 associates the quantile value Y with the probability value 1, since a return of Y or below has a probability of 1 for the probability density function of FIG. 2 (a return value above Y has a probability of zero). FIG. 4 illustrates a return distribution 402 and multiple transformed return distributions 404, 406, 408, 410, 412, 414, and 416. Each transformed return distribution represents the return distribution from which the quantile values generated by the quantile function network 112 are effectively sampled if the probability values processed by the quantile function network 112 are transformed using a respective distortion risk measure function. The transformed return distributions 404 and 406 reduce the impact of the tails of the return distribution 402. The transformed return distributions 408, 410, 412, 414, and 416 heavily shift the distribution mass towards the tails, creating a risk-averse or risk-seeking preference. More specifically, the transformed return distributions 410, 412, 414, and 416 cause the resulting action selection policy to be more risk-averse by shifting the distribution mass towards the left tail. The transformed return distribution 408 causes the resulting action selection policy to be more risk-seeking by shifting the distribution mass towards the right tail. In particular, quantile values sampled from the transformed return distribution 408 are more likely to have higher values (thereby making the action more likely to be selected) even if the return distribution 402 has a long left tail (indicating the action may result in a large negative return).

Figure 5:
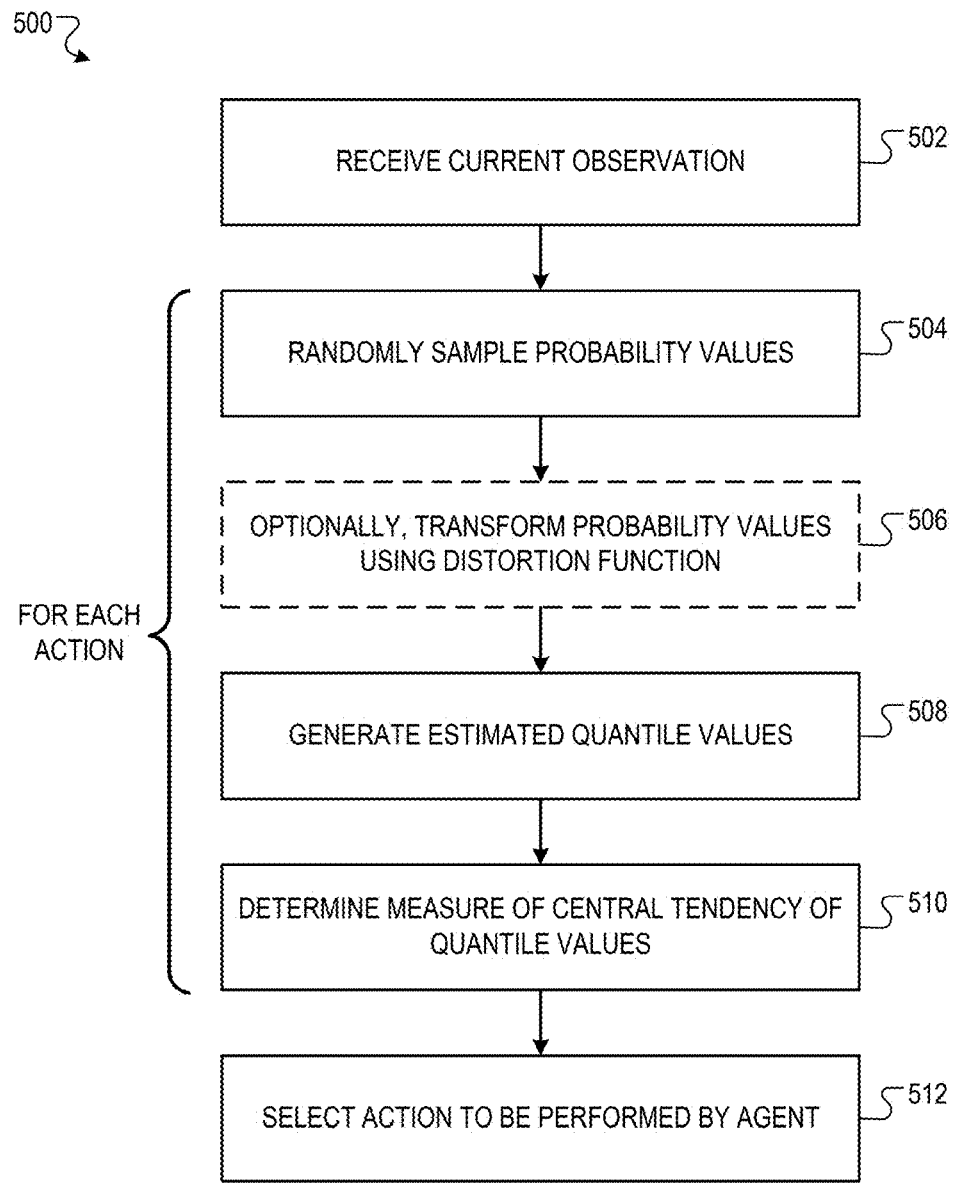
FIG. 5 is a flow diagram of an example process for selecting an action to be performed by an agent using a quantile function network.

FIG. 5 is a flow diagram of an example process 500 for selecting an action to be performed by an agent using a quantile function network. For convenience, the process 500 will be described as being performed by a system of one or more computers located in one or more locations. For example, a reinforcement learning system, e.g., the reinforcement learning system 100 of FIG. 1, appropriately programmed in accordance with this specification, can perform the process 500.

The system receives a current observation characterizing a current state of an environment being interacted with by an agent (502). The current observation may be generated by or derived from sensors of the agent. For example, the current observation may be captured by a camera of the agent. As another example, the current observation may be derived from data captured from a laser sensor of the agent. As another example, the current observation may be a hyperspectral image captured by a hyperspectral sensor of the agent.

Steps 504-510 describe an example process which the system can perform for each action in a set of actions that can be performed by the agent to determine a respective measure of central tendency of a respective set of quantile values corresponding to each action. In particular, steps 504-510 assume that the quantile function network is configured to process an action—observation—probability value tuple to generate an estimated quantile value for the probability value with respect to the return distribution that would result from the agent performing the action in response to the observation. As described earlier, in some cases the quantile function network may be configured to process an observation—probability value tuple to generate respective estimated quantile values for the probability value for each respective action in the set of actions in response to the observation. In these cases, the system may perform the steps 504-510 once (i.e., rather than separately for each action) to determine the measures of central tendency of the respective sets of quantile values corresponding to each action.

The system randomly samples one or more probability values in the interval [0,1] (504). For example, the system may independently the sample the probability values from a probability distribution that is supported on the interval [0,1]. The system can sample the probability values from any appropriate probability distribution, for example, a uniform distribution on the interval [0,1].

Optionally, the system transforms the probability values by processing the probability values using a distortion risk measure function (506). In some cases, the distortion risk measure function is a non-decreasing function mapping the domain [0,1] to the range [0,1], which maps the point 0 in the domain to the point 0 in the range, and which maps the point 1 in the domain to the point 1 in the range. An example of a distortion risk measure function is the cumulative probability weighting parameterization:

$$D(\tau) = \frac{\tau^\eta}{(\tau^\eta + (1-\tau)^\eta)^{\frac{1}{\eta}}} \tag{1}$$

where $\tau$ is the sampled probability value and $\eta$ is a hyper-parameter (e.g., a positive real number). Another example of a distortion risk measure function is given by:

$$D(\tau) = \Phi(\Phi^{-1}(\tau) + \eta) \tag{2}$$

where $\tau$ is the sampled probability value, $\eta$ is a hyper-parameter, $\Phi$ is the cumulative distribution function of a standard Normal distribution, and $\Phi^{-1}$ is the inverse of the cumulative distribution function of a standard Normal distribution. A "hyper-parameter" refers to a predetermined numerical value. Transforming the probability values using a distortion risk measure function is equivalent to sampling the probability values from a transformed probability distribution defined by the composition of the original probability distribution and the distortion risk measure.

The system generates a respective estimated quantile value for each probability value with respect to a return distribution that would result from the agent performing the action in response to the current observation (508). More specifically, for each probability value, the system processes an action—current observation—probability value tuple using the quantile function network, in accordance with current values of quantile function network parameters, to generate a corresponding estimated quantile value.

The quantile function network can be implemented by using any appropriate neural network architecture. For example, the quantile function network may include one or more convolutional layers that are configured to process an observation provided as an input to the quantile function network to generate an encoded representation of the observation. The quantile function network may include one or more neural network layers that are configured to process the probability value provide as an input to the quantile function network to generate an encoded representation of the probability value with the same dimensionality as the encoded representation of the observation. The quantile network may generated a combined representation by combining the respective encoded representations of the observation and the probability value (e.g., by pointwise multiplying them) and a numerical (e.g., one-hot) representation of the action, and process the combined representation using one or more fully-connected layers to generate the output. In a particular implementation, the neural network layers used to generate the encoded representation of the probability value may be a learned linear function of a set of cosine basis functions followed by a ReLU or sigmoid non-linearity.

The system determines a measure of central tendency of the estimated quantile values generated by the quantile function network (510). If the system generates a single estimated quantile value, then the system may determine the measure of central tendency to be the single estimated quantile value itself. Otherwise, the system may determine the measure of central tendency as, for example, the mean, median, or mode of the estimated quantile values generated by the quantile function network.

The system selects an action to be performed by the agent in response to the current observation based on the respective measures of central tendency determined for each of the actions that can be performed by the agent (512). In some implementations, the system selects an action having a highest corresponding measure of central tendency from amongst all the actions in the set of actions that can be performed by the agent. In some implementations, the system selects an action in accordance with an exploration strategy. For example, the system may use an $\epsilon$-greedy exploration strategy.

Figure 6:
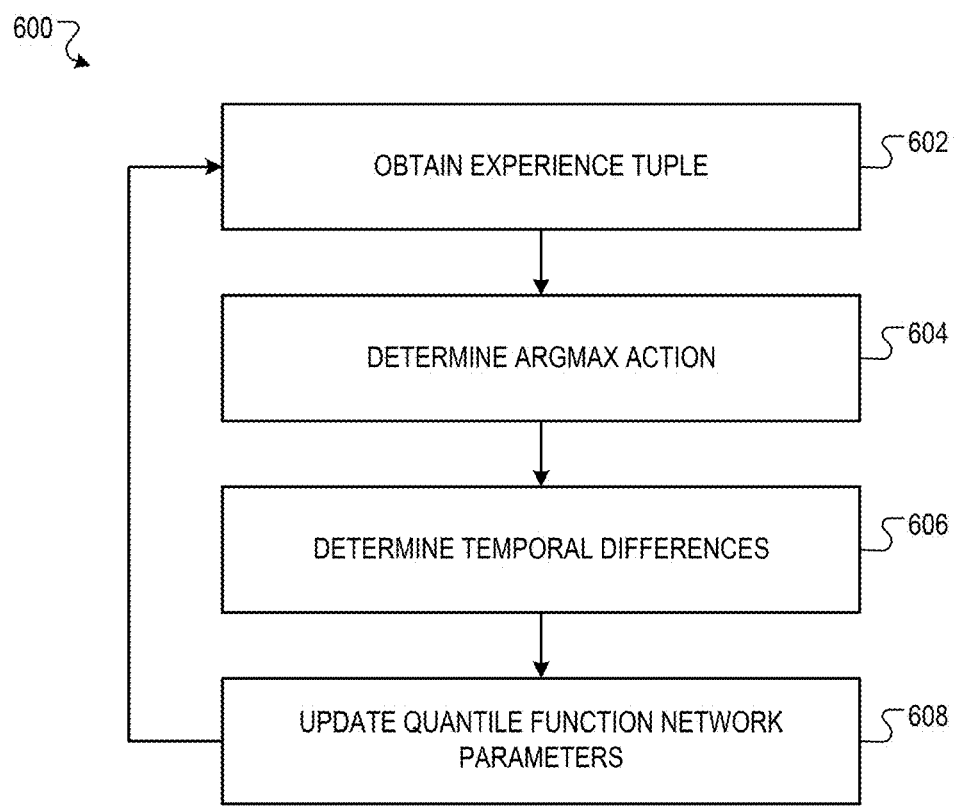
FIG. 6 is a flow diagram of an example process for training a quantile function network.

FIG. 6 is a flow diagram of an example process 600 for training a quantile function network. For convenience, the process 600 will be described as being performed by a system of one or more computers located in one or more locations. For example, a reinforcement learning system, e.g., the reinforcement learning system 100 of FIG. 1, appropriately programmed in accordance with this specification, can perform the process 600.

The system obtains a batch of one or more experience tuples (602). Each experience tuple includes: (i) a current training observation, (ii) a current action performed by the agent in response to the current training observation, (iii) a current reward received in response to the agent performing the current action, and (iv) a next training observation characterizing a state that the environment transitioned into as a result of the agent performing the current action. For example, the system may obtain the experience tuples by sampling them (e.g., randomly or using prioritized replay technique) from a data store that is configured to store multiple experience tuples. For convenience, the description of the process 600 which follows refers to training the quantile function network using a single experience tuple.

The system determines an "argmax" action for the experience tuple (604). The argmax action represents the "greedy" action that would be performed by the agent in response to the next training observation included in the experience tuple if the agent selects the action to be performed in accordance with the process 500 and without using an exploration policy. More specifically, the system determines the argmax action for the experience tuple by performing the steps 502-510 of the process 500 for the next training observation included in the experience tuple. By performing the steps 502-510 of the process 500 for the next training observation included in the experience tuple, the system determines a respective measure of central tendency of a set of one or more estimated quantile values generated by the quantile function network for each action. The system determines the argmax action as the action for which the measure of central tendency of the corresponding estimated quantile values is highest.

The system determines one or more temporal differences (606). To determine a temporal difference, the system determines a first estimated quantile value by randomly sampling a first probability value (e.g., from a uniform distribution over [0,1]) and processing the current training observation—current action—first probability value tuple using the quantile function network. The system determines a second estimated quantile value by randomly sampling a second probability value (e.g., from a uniform distribution over [0,1]) and processing the next training observation—argmax action—second probability value tuple using the quantile function network. Thereafter, the system determines the temporal difference based on at least: (i) the current reward, (ii) the first estimated quantile value, and (iii) the second estimated quantile value. For example, the system may determine the temporal difference $\delta$ as:

$$\delta = r + \gamma \cdot Z_{\tau_2}(x', \alpha^*) - Z_{\tau_1}(x, \alpha) \quad (3)$$

where r is the current reward, $\gamma$ is a constant discount factor, $Z_{\tau_2}(x', \alpha^*)$ is the second estimated quantile value, and $Z_{\tau_1}(x, \alpha)$ is the first estimated quantile value. In some cases, the system determines the second estimated quantile value by processing the next training observation—argmax action—second probability value tuple using a target quantile function network (e.g., as described with reference to FIG. 1) rather than the quantile function network.

To determine multiple temporal differences, the system may randomly sample a first set of multiple probability values $\{\tau_i\}_{i=1}^{N}$ and a second set of multiple probability values $\{\tau_j'\}_{j=1}^{N'}$. Thereafter, the system can generate a set of multiple temporal differences $\{\delta_{ij}\}$ as:

$$\delta_{ij} = r + \gamma \cdot Z_{\tau_j'}(x', \alpha^*) - Z_{\tau_i}(z, \alpha) \quad (4)$$

where $i \in \{1, \ldots, N\}$, $j \in \{1, \ldots, N'\}$, r is the current reward, $\gamma$ is a constant discount factor, $Z_{\tau_j'}(x', \alpha^*)$ is a second estimated quantile value (i.e., obtained by processing the next training observation—argmax action—$\tau_j'$ tuple using the quantile function network), and $Z_{\tau_i}(x, \alpha)$ is a first estimated quantile value (i.e., obtained by processing the current training observation—current action—$\tau_i$ tuple using the quantile function network).

The system updates the current values of the quantile function network parameters based on the temporal differences (608). For example, the system can determine a gradient of a loss function that depends on the temporal differences, for example, using backpropagation. Thereafter, the system can update the current values of the quantile function network parameters using the gradient based on any appropriate gradient descent algorithm update rule, for example, an update rule defined by the Adam or RMSprop gradient descent algorithms. An example of a loss function $\mathcal{L}$ that depends on the temporal differences is given by the Huber quantile regression loss:

$$\mathcal{L} = \frac{1}{N'}\sum_{i=1}^{N}\sum_{j=1}^{N'}\rho_{\tau_i}^{\kappa}(\delta_{ij}) \qquad (5)$$

$$\rho_{\tau}^{\kappa} = |\tau - \mathbb{1}\{\delta_{ij} < 0\}|\frac{\mathcal{L}_{\kappa}(\delta_{ij})}{\kappa} \qquad (6)$$

$$\mathcal{L}_{\kappa}(\delta_{ij}) = \begin{cases} 0.5 \cdot \delta_{ij}^2, & \text{if } |\delta_{ij}| \leq \kappa \\ \kappa \cdot (|\delta_{ij}| - 0.5 \cdot \kappa), & \text{otherwise} \end{cases} \qquad (7)$$

where the temporal differences $\{\delta_{ij}\}$ are defined with reference to equation 4, $\rho_\tau^\kappa$ is a quantile regression loss (with probability value parameter $\tau$), $\kappa$ is a hyper-parameter, and $\mathbb{1}\{\delta_{ij}<0\}$ is an indicator function that has value 1 if and only if the temporal difference $\delta_{ij}$ is negative, and has value 0 otherwise.

When the system updates the current values of the quantile function network parameters using a batch of multiple experience tuples, the system can determine a respective gradient of the loss function defined by equation 5 for each of the multiple experience tuples. The system can thereafter adjust the current values of the quantile function network parameters using each of the determined gradients.

After updating the current values of the quantile function network parameters, the system can determine whether a training termination criterion is met. For example, the system may determine that a training termination criterion is met if the system has performed a predetermined number of training iterations. As another example, the system may determine that a training termination criterion is met if an agent interacting with an environment by selecting actions in accordance with the current values of the quantile network parameters achieves an acceptable performance level (e.g., in accomplishing a task). In response to determining that a training termination criterion is met, the system can output the trained values of the quantile function network parameters. In response to determining that a training termination criterion is not met, the system can return to step 602 and perform one or more additional training iterations.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A method performed by one or more computers, the method comprising:
   selecting an action to be performed by a reinforcement learning agent interacting with an environment, comprising:
   receiving a current observation characterizing a current state of the environment;
   for each action of a plurality of actions that can be performed by the agent to interact with the environment:
   processing a network input that comprises the action, the current observation, a risk-sensitive value that increases a level of risk aversion in selecting the action to be performed by the agent, using an action selection neural network, in accordance with values of a set of action selection neural network parameters, to generate an action selection neural network output,
   wherein the action selection neural network output characterizes a return distribution that defines a probability distribution over possible returns that would result from the agent performing the action in response to the observation; and
   selecting an action from the plurality of actions to be performed by the agent in response to the current observation using the action selection neural network outputs.

2. The method of claim 1, wherein for each action of the plurality of actions, the risk-sensitive value is generated as an output of a risk measure function.

3. The method of claim 2, wherein for each action of the plurality of actions, the risk-sensitive value is generated as an output of a distortion risk measure function.

4. The method of claim 2, wherein for each action of the plurality of actions, generating the risk-sensitive value as the output of the risk measure function comprises:
   sampling a random value; and
   processing the random value using the risk measure function to generate the risk-sensitive value.

5. The method of claim 4, wherein the random value is sampled from a uniform distribution over an interval [0,1].

6. The method of claim 4, wherein the risk measure function is a non-decreasing function mapping a source domain to a target range.

7. The method of claim 6, wherein the risk measure function maps a point 0 in the source domain to a point 0 in the target range.

8. The method of claim 6, wherein the risk measure function maps a point 1 in the source domain to a point 1 in the target range.

9. The method of claim 2, wherein the risk measure function is configured to generate risk-sensitive values that increase a level of risk aversion in selecting the action to be performed by the agent.

10. A system comprising:
    one or more computers; and
    one or more storage devices communicatively coupled to the one or more computers, wherein the one or more storage devices store instructions that, when executed by the one or more computers, cause the one or more computers to perform operations comprising:
    selecting an action to be performed by a reinforcement learning agent interacting with an environment, comprising:
    receiving a current observation characterizing a current state of the environment;
    for each action of a plurality of actions that can be performed by the agent to interact with the environment:
    processing a network input that comprises the action, the current observation, a risk-sensitive value that increases a level of risk aversion in selecting the action to be performed by the agent, using an action selection neural network, in accordance with values of a set of action selection neural network parameters, to generate an action selection neural network output,
    wherein the action selection neural network output characterizes a return distribution that defines a probability distribution over possible returns that would result from the agent performing the action in response to the observation; and
    selecting an action from the plurality of actions to be performed by the agent in response to the current observation using the action selection neural network outputs.

11. The system of claim 10, wherein for each action of the plurality of actions, the risk-sensitive value is generated as an output of a risk measure function.

12. The system of claim 11, wherein for each action of the plurality of actions, the risk-sensitive value is generated as an output of a distortion risk measure function.

13. The system of claim 11, wherein for each action of the plurality of actions, generating the risk-sensitive value as the output of the risk measure function comprises:
    sampling a random value; and
    processing the random value using the risk measure function to generate the risk-sensitive value.

14. The system of claim 13, wherein the random value is sampled from a uniform distribution over an interval [0,1].

15. One or more non-transitory computer storage media storing instructions that when executed by one or more computers cause the one or more computers to perform operations comprising:
    selecting an action to be performed by a reinforcement learning agent interacting with an environment, comprising:
    receiving a current observation characterizing a current state of the environment;
    for each action of a plurality of actions that can be performed by the agent to interact with the environment:
    processing a network input that comprises the action, the current observation, a risk-sensitive value that increases a level of risk aversion in selecting the action to be performed by the agent, using an action selection neural network, in accordance with values of a set of action selection neural network parameters, to generate an action selection neural network output,
    wherein the action selection neural network output characterizes a return distribution that defines a probability distribution over possible returns that would result from the agent performing the action in response to the observation; and
    selecting an action from the plurality of actions to be performed by the agent in response to the current observation using the action selection neural network outputs.

16. The non-transitory computer storage media of claim 15, wherein for each action of the plurality of actions, the risk-sensitive value is generated as an output of a risk measure function.

17. The non-transitory computer storage media of claim 16, wherein for each action of the plurality of actions, the risk-sensitive value is generated as an output of a distortion risk measure function.

18. The non-transitory computer storage media of claim 16, wherein for each action of the plurality of actions, generating the risk-sensitive value as the output of the risk measure function comprises:
sampling a random value; and
processing the random value using the risk measure function to generate the risk-sensitive value.

19. The non-transitory computer storage media of claim 18, wherein the random value is sampled from a uniform distribution over an interval [0,1].

20. The non-transitory computer storage media of claim 18, wherein the risk measure function is a non-decreasing function mapping a source domain to a target range.

* * * * *